United States Patent Office.

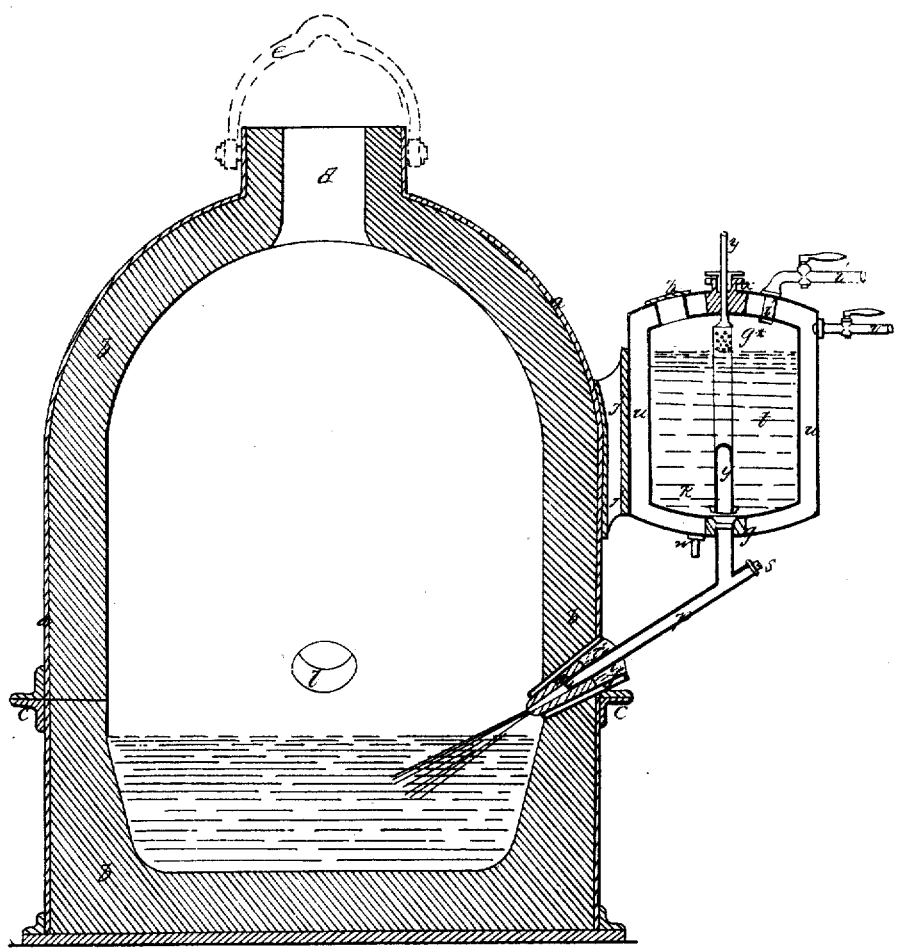

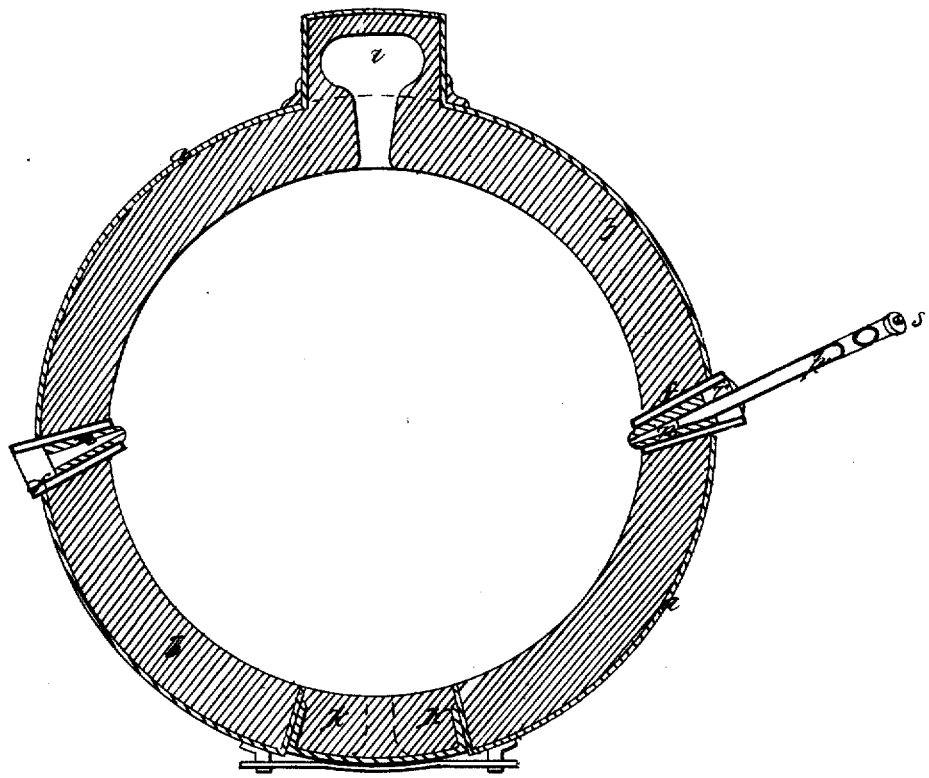

HENRY BESSEMER, OF LONDON, ENGLAND.

Letters Patent No. 94,995, dated September 21, 1869; patented in England, March 21, 1868.

IMPROVEMENT IN THE MANUFACTURE OF IRON AND STEEL.

The Schedule referred to in these Letters Patent and making part of the same.

*To all to whom it may concern:*

Be it known that I, HENRY BESSEMER, of Queen Street Place, Cannon street, in the city of London, England, a subject of the Queen of Great Britain, have invented or discovered new and useful "Improvements in the Manufacture of Refined Iron and of Malleable Iron and Steel;" and I, the said HENRY BESSEMER, do hereby declare the nature of the said invention, and in what manner the same is to be performed, to be particularly described and ascertained in and by the following statement thereof; that is to say—

My improvements consist in forcing or injecting into molten crude iron, or remelted pig-iron, or other carburet of iron, in a more or less refined state, streams or jets of fused or fluid nitrate of soda, or nitrate of potash, or other fused or fluid substances which contain or are capable of evolving oxygen, when brought in contact with fluid iron, such substances being used alone, or in conjunction with oxides, peroxides, or silicates of the peroxides of iron or manganese. The streams or jets of fused or fluid matters are projected downward, at any desired angle, from nozzles or tuyeres, the orifices of which are situated above the mean level or upper surface of the fluid iron to be operated upon, a portion of the said fused or fluid matters, as well as a portion of the cinder or oxide produced in the process, being again carried down into the molten metal, as an induced current, caused by the passage of the said jets or streams, which will pass downward through any fluid matters floating on the surface, and penetrate the fluid metal, and be there more or less decomposed, and operate upon the metal, and the impurities contained therein, and will more or less decarbonize and refine the iron, and convert it into steel, or into malleable iron, or into a more or less refined cast-iron, dependent on the quantity and constituents of the fused or fluid matters injected therein.

The iron to be operated upon by the injection of the said fused or fluid matters, may be contained in a vessel mounted on trunnions, similar to those vessels known as "converters," and now generally employed in the Bessemer process of manufacturing malleable iron and steel, or the metal may be treated in a cylindrical or other fixed vessel or chamber, lined with fire-brick, gannister, or other suitable refractory material; or, in lieu thereof, the iron may be operated upon in the hearth of a "finery-furnace," similar to those generally employed in refining crude or pig-iron for puddling.

When employing such a furnace for the purpose of my invention, I arrange a set of air-tuyeres along one side thereof, for melting the pig-metal, and partially refining the same, and on the other side of the hearth I employ a separate set of tuyeres or nozzles, for the purpose of injecting the aforesaid fused or fluid matters into the molten iron; or, instead of this arrangement, the finery furnace may have three ordinary air-tuyeres on each side thereof, with two small tuyeres for the injection of the fluid matters on each side of the furnace, occupying the spaces between the air-tuyeres.

The process in this finery-furnace may be discontinued while the metal is in the condition of highly-refined cast-iron, approaching to steel, or it may be continued until a more or less perfectly-malleable metal is obtained, suitable for melting in crucibles, or otherwise, to form steel, or the metal may be allowed to granulate or assume a more or less solid condition, with or without manipulation with an iron bar or rabble, and be removed from the finery-furnace in a condition to be formed into bars or blooms; or, in lieu thereof, the process may be carried on in a reverberatory or puddling-furnace, heated by solid fuel, or by means of heated air and gas, in either of which last-named cases it will be preferable to make the furnace much larger and deeper in the hearth than is usual in ordinary puddling-furnaces.

Mill-scales, iron-ore, or other matters now employed in puddling iron, may also be employed in this process.

When the iron to be treated by the means hereinbefore described contains much phosphorus, it will be preferable, by regulating or stopping for a time the jets of fused or fluid matters before named, to allow such metal, during the process, to pass into or assume a more or less pasty, granular, or solidified condition, in order to its more ready parting with the phosphorus it contains to the cinder or other fluid matters in contact with the metal.

When iron is so treated, it may be taken out of the furnace in a more or less solid state, and be worked in a squeezer, or in the rolls, or under a steam-hammer, and be made at once into bars or blooms; or, in lieu thereof, an addition may be made to it of some fluid pig-iron, of a good quality, (by preference containing manganese,) before removing the metal from the furnace or vessel in which it is treated, and the whole may then be melted down together, and run off in a fluid state into a ladle, and made into ingots or castings.

For the purposes of my present invention, I prefer to melt the said nitrate of soda, nitrate of potash, or other fusible matters, in a jacketed iron vessel, by means of highly-heated atmospheric air, or superheated steam, and to use the pressure of such air or steam to act on the surface of such fluid matters, in order that they may thus be driven downward upon the fluid metal, with such force as to penetrate far into the molten mass, and put the same into rapid motion, and thus in turn bring all parts thereof under operation. This motion, in cylindrical vessels, is best attained by placing the jet-pipes at a tangent to the circumference. And in order that the mode by which I prefer to carry into practice my invention may be fully understood, I have hereunto annexed a sheet of drawings, in which a fixed cylindrical vessel, suitable for the purpose, is shown in vertical section at Figure 1, and in horizontal section at Figure 2.

$a$ is outer casing, of plate-iron, with a thick lining of gannister, or other refractory material, $b$. The vessel is made in two parts, united together with a flange at $c$, so that the upper part may be lifted off the lower one when desired, and thus give access to the interior.

The upper part of the vessel is domed, and terminates in an opening, $d$, through which the sparks and gaseous products given off during the process may escape.

A large loop of iron, $e$, is jointed externally to the mouth of the vessel, so as to be moved from over the opening $d$. During the process, this loop serves to attach the upper part of the vessel to the crane when it is to be removed.

On two opposite sides of the vessel, there are tuyeres, dipping downward at an angle, and inclined toward a tangent to the circumference of the vessel. These tuyeres consist of an outer iron shell, $f$, in which water may circulate, as usual in water-tuyeres.

A fire-clay nozzle, $n$, is fitted into the water-tuyere, and into this nozzle the injection-pipe $p$ enters, and is made tight by a ramming of loam, $r$.

At $s$ there is a screwed cap, to give access to the injection-pipe $p$, so that it may be cleared out with a rod, when necessary.

A branch of the injection-pipe passes upward into the chamber $t$, which contains the fluid to be injected into the metal. This chamber $t$ has an outer jacket, $u$, leaving a space between it and the chamber $t$, for the circulation of highly-heated air or superheated steam, which is admitted by the pipe and cock $v$, and escapes through a small nozzle, $w$.

On the upper part of the jacket, a stuffing-box, $x$, is formed, through which a rod, $y$, passes. This rod may be raised or lowered by any convenient lever-arrangement, or by a screw, as commonly employed in sluice-valves, in the interior of the chamber $t$. The rod $y$ is made tubular, having numerous holes to admit air or steam to its interior, as shown at $y^*$. The lower part of this tubular rod is formed into a cone-valve, fitting into a seating, $g$, and, by closing the orifice of the injection-pipe, prevents the passage of any fluid from the chamber $t$, so long as the valve is closed.

$h$ is an opening or screw-plug, through which the nitrates, or other matters to be injected into the fluid iron, are admitted to the chamber $t$, either in a solid form, and there to undergo fusion by the application of heated air or steam, or they may be admitted to the chamber $t$ in a previously-fused or fluid state, and be merely retained in that condition until required.

A pipe and cock, $i$, supplies air or steam, under pressure, to the interior of the chamber $t$, for the purpose of acting powerfully on the surface of the fluid, and causing it to be projected with such force on to the surface of the fluid iron as to enter into and pass down to, or nearly to, the lowest part of it.

The jacketed chamber $t$ is supported by a bracket, $j$, to the casing of the vessel $a$, and a similar jacketed chamber, not shown in the drawings, is also provided for each tuyere.

Before using the apparatus, a coke fire may be made in the interior of the converting-vessel, which should be well heated. The fuel may be supplied through the opening $d$, and a current of air be allowed to enter a hole in the door $k$, shown by dots, which hole, like that in an ordinary founder's cupola, will also serve for the discharge of the converted metal. I, however, prefer to urge the fire, by a blast of air introduced at the said opening, by a movable nozzle leading from a fan, or to provide one or more small tuyeres in the lower part of the vessel, for the admission of the blast, and which tuyeres may be stopped up by a plug of loam, previous to the admission of the metal to the vessel. The residue of the fuel, after heating the vessel, may remain in it, or it may be removed through the door $k$, which must then be loamed up prior to the admission of the metal to the vessel.

The vessel having thus been treated, and the nitrates or other matters rendered fluid in the chamber $t$, the fluid may be run into the vessel at the spout $l$, the aperture of which is then closed. Air or steam, under a pressure, by preference, of not less than fifty pounds per square inch, and at a temperature of about 50° Fahrenheit above that at which the nitrate of soda or other substance which is being used fuses, is then admitted by the cock $i$ to the chamber $t$. It will immediately rush through the openings $Y^*$, and pass down through the hollow rod Y, and through the injection-pipe $p$, clearing the passage, and heating the pipe and tuyere through which the fluid will have to pass. The rod $y$ may then be raised, when the fluid nitrate, or other matter contained in the chamber $t$, will be driven through the valve formed in the lower part of the rod Y, and, passing down the pipe $p$, will be driven into the fluid metal, and be diffused in a finely-divided state through the metal. The tuyeres, being placed at a tangent, will cause a rapid rotation of the metal, so that all parts will be brought under the influence of the jets, and be equally acted upon. When the metal has been thus treated to the desired extent, it may be run out of the vessel, or removed through the door $k$, or it may be taken out by removing the upper part of the vessel, or, in lieu thereof, a further portion of molten carburet of iron may be run into the vessel, and be mixed with the converted metal, previous to running it off.

The oxygen-yielding material which I believe to be best suited for use in the process above set forth, I believe to be nitrate of soda. The quantity employed will depend on the quality of the iron, and of the product desired, as is well understood.

When oxides are used in conjunction with the nitrates, they may either be mixed therewith or placed on the surface of the melted metal, so as to be carried down into it by the induced current.

Having thus described my invention, and the manner in which it may be carried into practical operation, I desire it to be understood, that

What I claim as my invention, is—

The forcing or injecting downward into molten crude iron, or remelted pig or other carburet of iron, streams or jets of fused or liquid nitrate of soda, or nitrate of potash, or other fused or liquid substances which contain or are capable of evolving oxygen, when brought in contact with liquid iron.

HENRY BESSEMER.

Witnesses:
DAVID LONGSDON,
   *Catford Hill, Forest Hill;*
G. F. WARREN,
   *No. 17 Grace Church street, London, E. C.*